Patented Dec. 2, 1941

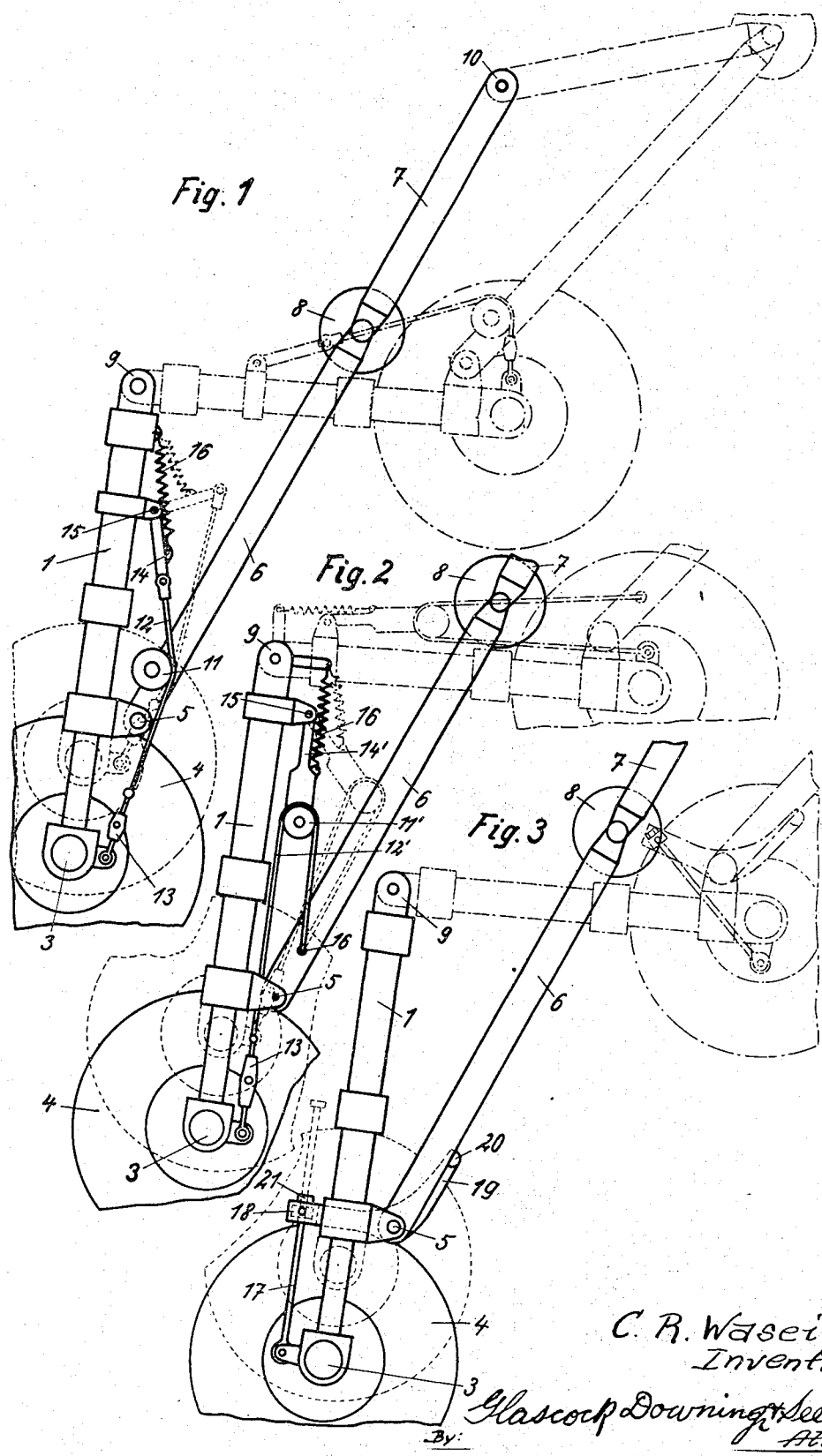

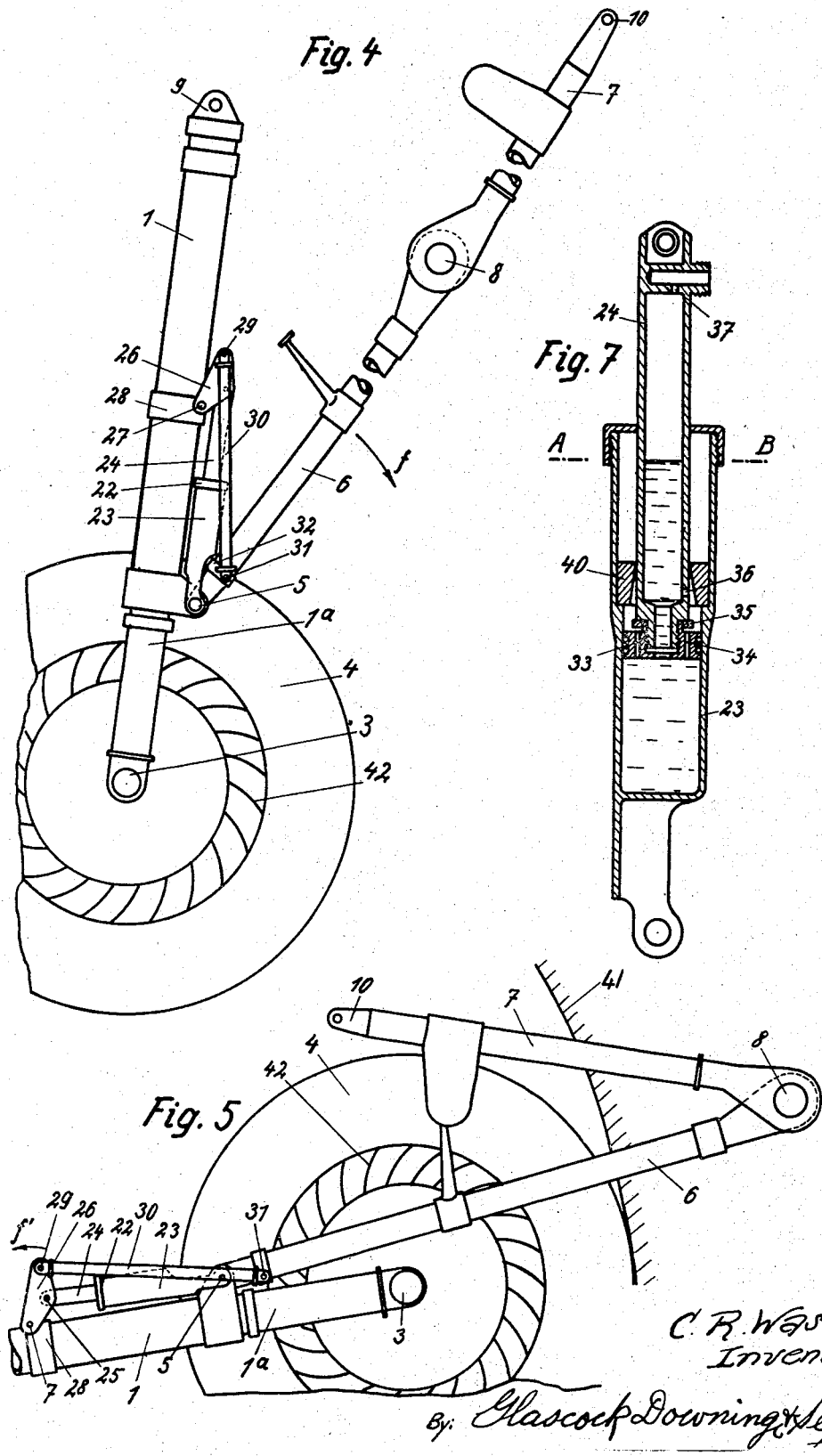

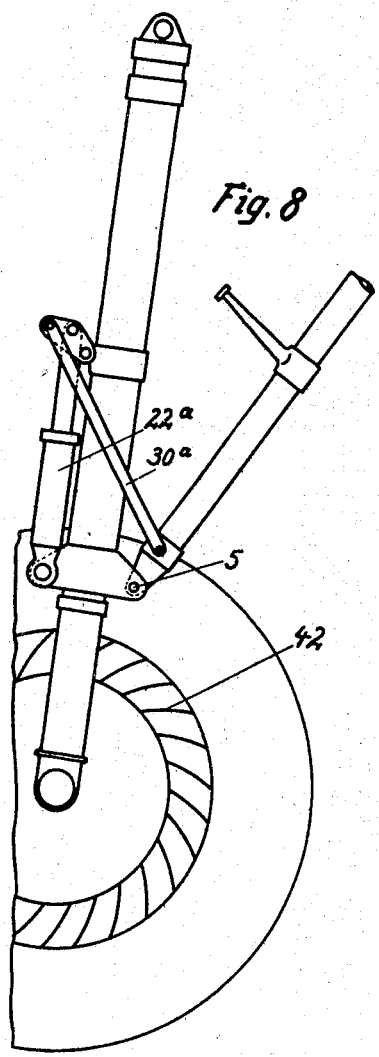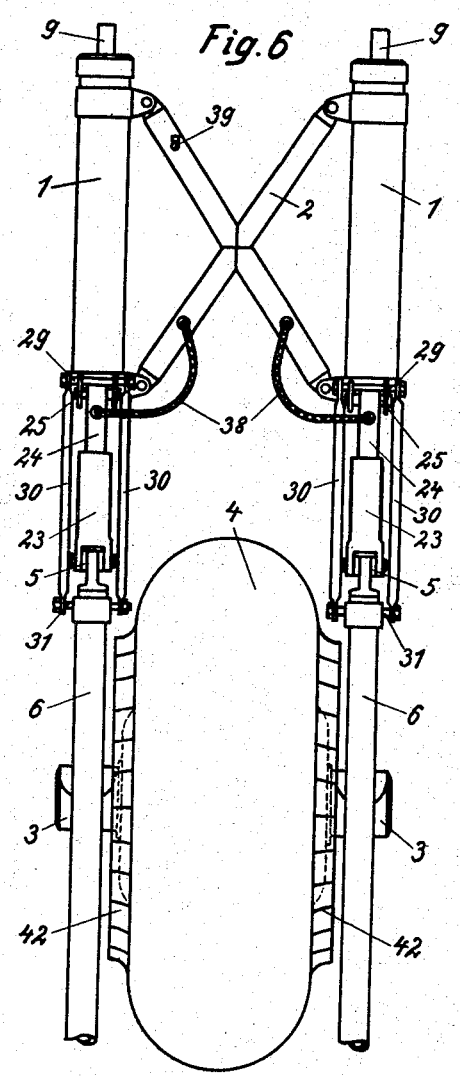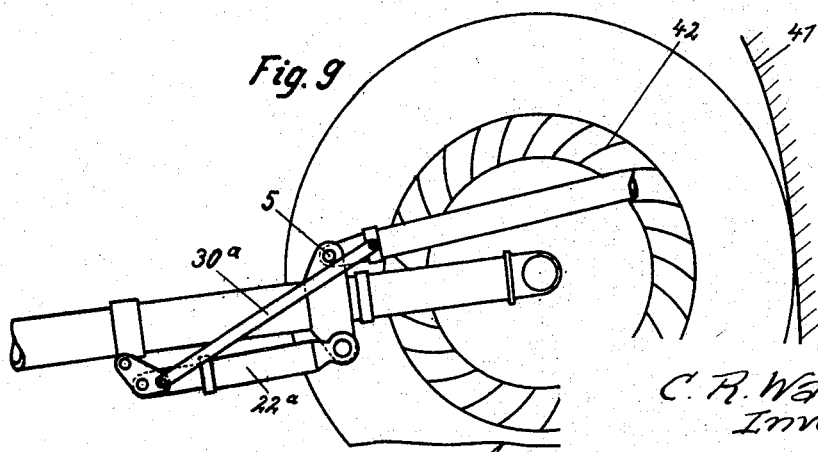

2,264,923

UNITED STATES PATENT OFFICE 2,264,923

RETRACTABLE LANDING GEAR FOR AIRCRAFT

Charles Raymond Waseige, Rueil, France, assignor to Air-Equipment, Bois-Colombes, Seine, France, a company of France Application August 24, 1938, Serial No. 226,569
In France September 10, 1937

15 Claims. (Cl. 244—102)

My invention relates to mechanisms for operating retractable landing gear or other retractable arrangement for aircraft.

By landing gear, is to be understood herein the assembly formed by any element which is intended to come into contact with the ground, such as a single wheel or a train of wheels, a ski, a float, its supporting frame and its shock-absorber or shock-absorbers, which will hereinafter be called landing shock-absorbers. It has been proposed to provide the operating mechanisms in question with means which, during at least a part of the operation of the landing gear, tension a resilient returning element, for example by using for tensioning said resilient element the relative movement, during this part of the operation, of two parts of the supporting frame, the energy thus stored in said resilient returning element being restored by the latter during another part of the operation or the reverse operation in order to assist these latter and to supplement the action of gravity.

The resistance of the air to the lowering of the landing gear is maximum at the end of the lowering, whereas the action of the actual weight of the gear for assisting the lowering becomes minimum at that instant. It would therefore be desirable for the intensity of the action of the returning device to vary in the reverse direction. Now, the resilient systems formed by resilient metal members or by elastic cords have a retracting force which decreases considerably, proportionally to the travel, as they relax. In order to retain a sufficient force at the end of the lowering, it does become necessary to use extremely powerful and stiff resilient members, but in that case it is almost impossible for their resilient deformation to have a sufficient amplitude. Conversely, if they are constructed so that they have a sufficient amplitude of resilient deformation, their retracting force at the end of the travel is insufficient.

My invention has, in particular, for its object to eliminate the above mentioned drawbacks. A further object of my invention is to provide means wholly carried by the retractable arrangement and forming part of same adapted both during the extension to supplement the action of gravity and to brake the violence of the extension operation.

A further object is to use for extending the landing gear a pneumatic or oleo-pneumatic shock-absorber which may be of known type.

An advantage of using such a shock-absorber is that it is possible to construct same so that its retracting force varies little with the resilient deformation travel and that any desirable amplitude can be given said travel. For this purpose, it suffices for the volume of air to be sufficient.

By way of non-limitative examples, various embodiments of my invention applied to the same type of landing gear, have been shown in the accompanying drawings.

In said drawings:

Figs. 1 to 3 are diagrammatical side elevations of the landing gear and show three different embodiments;

Figure 4 is a side view of a half landing gear in the position for landing and shows another embodiment;

Fig. 5 is a similar view of this same landing gear, but in the retracted position;

Fig. 6 is a front and a top view of the half landing gear in the retracted position;

Fig. 7 is a longitudinal diagrammatical section of the auxiliary shock-absorber; and Figs. 8 and 9 are respectively similar views to Figs. 4 and 5 but showing a modification of construction.

In the various exemplary embodiments shown, the landing gear is of the known type provided with two parallel legs formed by known shock-absorbers having a fixed upper part $I$ and a movable lower part $Ia$ which is capable of sliding axially relatively to the upper part $I$. The upper parts are braced by a cross-piece 2 (Fig. 6) and the lower parts by an axle 3 which supports a wheel 4. Towards the bottom of each fixed part $I$ is pivoted about an axle 5 parallel with the axle 3 of the wheel, a strut composed of two bars 6 and 7 connected to each other by a driving joint 8 of known type which actuates them and imparts to them a relative movement which causes them to pass from a position in which they are substantially in the extension of each other (shown in full lines in the drawings) to another position in which they are folded on to each other (shown in chain dotted lines in the drawings). The struts $I$ each carry at their upper part a joint jaw 9 having its axis parallel with that of the wheel and intended to be mounted on a pin which has a fixed position on the aircraft. Similarly, the bars 7 each carry a joint jaw 10 which is also intended to be mounted on a pin fixed to the aircraft. According to the position given the bars 6 and 7 by the driving joint 8, the struts $I$ and the wheel 4 occupy the position called landing position or are retracted.

In the exemplary embodiment of the invention shown in Fig. 1, each bar 6 carries a loose pulley 11 over which passes a flexible bond 12, a chain or a cable, which is connected on the one hand to the lower movable part 1a of the corresponding shock-absorber, preferably by means of a tightener 13, and on the other hand to a connecting rod 14 which is pivoted at 15 on the upper part of the shock absorber and is constantly urged to rotate by a spring 16.

The operation of this device is as follows:

During its movements when the aeroplane comes into contact with the ground, or while it is rolling along the ground, and the shock-absorber 1 shortens under an impact, the lower point of connection of the bond 12 moves towards the pulley 11 but said bond 12 remains taut owing to the fact that the spring 16 causes the connecting rod 14 to rotate on its pin 15 and pulls the whole of the bond upwards; this movement of the bond 12 as a whole has the sole effect of rotating the loose pulley 11. When the shock-absorber expands, it causes the bond 12 to move downwards again and to rotate the connecting rod 14 against the action of the spring 16.

When the compass 6, 7 closes and retracts the landing gear, a relative movement of the lower arm 6 of the compass and of the shock-absorber 1 occurs, said arm 6 tending to move away from the shock absorber. This causes the pulley 11 to bear on the bond and compels it to bend, moving its two points of connection towards each other therefore tensioning the shock-absorber 1. It can be readily seen that during the retracting, an instant occurs from which the arm 6 tends to move towards the shock-absorber 1, so that said shock-absorber partially expands and pulls the bond 12 which then presses against the pulley 11 and so helps to complete the retraction of the landing gear. When the landing gear is being lowered, the previous operation is repeated in the reverse direction: the shock-absorber starts by braking the lowering by tensioning itself to the extent it had been tensioned during the retracting, then expands and helps the end of the lowering.

In the exemplary embodiment of Fig. 2, the loose pulley 11' is carried by the connecting rod 14' instead of being fixed on the lower arm 6 of the compass, as in the example of Fig. 1, and the bond 12' is attached to said arm at 16 after passing over the pulley 11' instead of being fixed to the connecting rod 14'. The operation is absolutely similar to that of the device of Fig. 1 but it will be observed that the pull of the bond on the movable lower part of the shock-absorber is effected along directions which deviate much less from a line parallel with the axis of the shock-absorber than in the case of Fig. 1. On the other hand, it can easily be seen that according to the position of the connecting point 16 of the bond on the lower arm 6 of the compass, the movement of the movable part of the shock-absorber during the retracting or the lowering will or will not have a dead centre which separates its total travel into two successive sections, one resisting and the other driving.

In the exemplary embodiment of Fig. 3, a rigid rod 17 is pivoted on the movable part 1a of the shock-absorber and extends parallel with the axis of the latter; its upper end passes freely through a guiding sleeve 18 which is carried by a finger 19 in such a manner that it can rotate about a horizontal axis. Said finger 19 carries an extension 20 which is in contact with the rear face of the lower arm 6 of the compass and, beyond said sleeve, an abutment 21 is fixed on said rod 17. When the shock-absorber oscillates under the impact during the landing or while the aeroplane is rolling along the ground, the rod 17 slides freely in the sleeve 18 and the usual operation of the shock-absorber is in no way modified. When the compass 6, 7 closes to retract the landing gear, the finger 19 which is displaced by its extension 20 participates in the relative rotary movement which occurs between the arm 6 and the shock-absorber 1 and bears on the abutment 21, thereby causing the movable part 1a of the shock-absorber to slide by means of the rod 17 and tensioning the shock-absorber. In this case again, the travel of the movable part of the shock absorber during the retracting and the lowering of the landing gear may or may not have a dead centre, a fact which depends on the position of the finger 19.

In the exemplary embodiment of Figs. 4 to 7, auxiliary shock-absorbers 22, which are in this case oleo-pneumatic, are respectively mounted on the landing struts 1 and are arranged in this case behind and along said struts. Each of said shock-absorbers in this example comprises two parts 23 and 24 which slide axially on each other and are respectively formed by a cylinder and the rod of a piston. The cylinder 23 is pivoted by its lower end on the same pin 5 as the bar 6 whereas the upper end of the piston 24 is pivoted on a pin 25 carried by an arm 26 which is pivoted on a pin 27 that is carried by a collar 28 which is fixed on the fixed part of the corresponding strut 1. The arm 26 is furthermore pivoted at 29 on a bar 30, the other end of which is pivoted on a pin 31 carried by a collar 32 which is fixed on the lower part of the bar 6. Said pins 25, 27, 29 and 31 are parallel with the pin 5 and the assembly formed by the fixed part of the strut 1 between the pins 5 and 27, the arm 26, the bar 20 and the part of the bar 6 between the pins 31 and 5, forms a hinged quadrilateral, at the summit 5 of which is hinged one end of the auxiliary shock-absorber 22 of which the other end is pivoted on a pin 25 carried by the side opposite said summit. On the inside, each shock-absorber is provided with a piston 33 which is fast on the end of the rod 24 and carries fluid-tight rings in the cylinder 23. Said piston has channels 34 passing right through it which open on the rear face opposite a closure valve 35 formed by an annular disc which is axially movable on the rod 24 between said piston 33 and a shoulder forming an abutment. The rod 24 is hollow and its inner chamber communicates freely with the part of the cylinder located in front of the piston 33, whereas the part of the cylinder behind the piston can only communicate with said chamber through narrow orifices 36 extending through the wall of said rod. On the other hand, the inner chamber of the rod 24 communicates through the orifice 37 with a flexible pipe 38 leading to compressed air reservoir formed in this case by the cross-piece 2 which braces the struts 1, and which for this purpose is formed by tubes on which is fixed a compressed air inlet cock 39. Finally, the rear end of the cylinder 23 carries a ring 40 which surrounds the rod 24, and the bore of which is conical and widens towards the cylinder.

The operation is as follows:

The whole arrangement is so constructed that when the landing gear is lowered and is in the position for landing (Fig. 4) the piston of each auxiliary shock-absorber 22 is located at the upper end of the cylinder 23. At this instant the liquid in the shock-absorber fills the cylinder 23 and rises in the hollow rod up to the level AB. When the landing gear is retracted and brought into the position of Fig. 5, the bar 6 undergoes, with respect to the strut 1, a relative rotary movement in the direction $f$ (Fig. 4), thereby deforming the hinged quadrilateral 5, 27, 29, 31 and causing the piston 33 to penetrate into the cylinder 23 at the same time as the whole of the shock-absorber 22 pivots in the direction $f$ about the pin 5. The liquid contained in the cylinder 23 in front of the piston 33 flows on to the rear face of said piston by passing through the channels 34 and forcing back the valve 35, without this causing a substantial resistance to the forward movement of the piston. The penetration of the rod 24 into the cylinder 23 produces a rise in the level of the liquid in said rod and consequently a compression of the air in the reservoir 2 which is common to both shock-absorbers. Thus, during the retraction of the landing gear, there is an accumulation of energy by compression of the air contained in the cross-piece 2.

During the lowering, the thrust exerted by the compressed air on the liquid in the cylinder 23 tends to produce a retracting movement of the rod 24 from the cylinder but the valve 35 closes the channels 34 so that the liquid which is on the rear face of the piston can only return into the other part of the cylinder by passing through the small orifices 36. This therefore causes a powerful hydraulic braking of the lowering of the landing gear. Said orifices 36 are spaced along the rod 24 and are gradually closed by the ring 40 as the rod 24 is retracted, thereby producing an increasing braking effect, the variation of which can be controlled at will by means of the cross-section and the arrangement of said orifices 36. Furthermore, the conical bore of the ring contributes to the gradation in the closing of said orifices.

The thrust of the liquid on the piston 33 tends to rotate the arm 26 in the direction $f1$ and said arm in turn pulls the bar 30. It will be observed that when the landing gear is retracted (Fig. 5) the axis of said bar 30 passes through the pivot pin 5 of the bar 6 on the strut 1. It follows that this pull is supported by the pivot 5 and has a zero turning moment relatively to said pin. As soon as the lowering movement has begun under the action of the driving joint 8 or of the actual weight of the landing gear, the axis of said bar 30 moves away from the pin 5 and the pull on said bar begins to have a turning moment which tends to rotate the bar 6 relatively to the strut 1 in the direction $f$, thereby helping the lowering of the landing gear. Said turning moment increases up to the position in which the landing gear is completely lowered (Fig. 4). On the other hand, it will be observed that during the retracting, the turning moment of the stress exerted by the bar 30 on the arm 26 relatively to the pivot pin 27 of this latter, increases as the piston penetrates and this effect is added to the decrease of the leverage of the stress transmitted by the bar 30, relatively to the pin 5, and decreases the force required from the driving joint 8, as the retracting proceeds, to tension the auxiliary shock-absorbers.

It will furthermore be noted that the auxiliary shock-absorbers with their fixing collars 28 and 32 and the cross-piece 2 forming a reservoir form an autonomous unit which can be added to a landing gear that has already been constructed.

In the modified construction of Figs. 8 and 9, the landing gear proper and the auxiliary shock-absorbers are identical with those of Figs. 4 and 5. Only the arrangement of the shock-absorbers on the struts of the landing gear is different. They are in this case arranged in front of the struts 1 in such a manner that the bar 30a passes from one side to the other of the pivot pin 5 so that the turning moment relatively to said pin of the force transmitted by said bar changes sign during the retracting travel and also during the lowering travel of the landing gear. The energy accumulated in the shock-absorbers 22a during the first phase of the retraction thus helps the retraction of the landing gear towards the end of said retraction.

In the exemplary embodiment shown of a device which is intended to set the wheel rotating before landing, said device comprises a circular slope 41 which is concentric with the pin of the pivot jaw 9 for the struts 1 and said slope is fixed on the structure of the aeroplane in such a manner that during the lowering of the landing gear the tyre rolls on said slope and rotates the wheel in the same direction as it has to rotate in when the aeroplane is rolling along the ground. Furthermore, the rim of the wheel carries on each side a set of blades 42 the blades of which are so constructed that the relative wind keeps up and accelerates the rotary movement thus imparted to the wheel. Optionally, said sets of blades may exist alone, without the slope, or they may be eliminated and the slope may remain alone.

The slope may be movable on the aeroplane and be so controlled that it only comes into contact with the tyre by the action of a device which is driven in synchronism with the landing gear lowering mechanism.

Of course, the invention is in no way limited to the details of construction illustrated or described which have only been given by way of example. Thus, for example, the invention may be applied to retractable landing gears of any system and whatever be their operating mechanism; it is obvious that the position of the slope for setting the wheel in motion varies according to the type of the landing gear, in particular according to whether the wheel is lowered from front to rear or from rear to front.

What I claim is:

1. In a retractable landing gear for aircraft, two parallel legs, a landing member carried by the lower part of said legs, a cross-shaped bracing member connecting together said legs at their upper part, storing and damping means arranged to be energized by retraction of said landing gear, said means including at least one oleo-pneumatic shock-damper wholly carried by said landing gear and thereby forming with the latter a self-contained unit, said crossed-shaped bracing member being hollow and designed to form a fluid-tight air-container, and pipe means between said bracing member and the shock-damper.

2. A retractable landing gear for aircraft including a landing member, at least one leg serving as a support for said landing member, storing and damping means arranged to be energised by retraction of said landing gear, said means including an oleo-pneumatic strut provided along said leg, and connecting means engaging the ends of said strut and two members respectively of the landing gear between which a relative displacement takes place during retraction of the landing gear, said connecting means being adapted to transform said relative displacement into an alteration of the length of said strut storing energy.

3. In a retractable landing gear for aircraft, a landing member at least one leg serving as a support for said landing member and storing and damping means arranged to be energised by retraction of said landing gear and to supplement the action of gravity for the extension, said means including an oleo-pneumatic strut provided along said leg, one end of said strut being pivoted to said leg, a hinged quadrilateral of which two adjacent sides consist of two members pivoted together of the landing gear and between which a relative displacement takes place during retraction of the landing gear, the other end of said strut being operatively connected to one of the two other sides of said hinged quadrilateral, the whole arrangement being so designed that deformation of said hinged quadrilateral pending retraction of the landing gear will be operative to produce an energisation of said strut.

4. A retractable landing gear as in claim 3, in which at least the side of the hinged quadrilateral other than that to which the strut is operatively connected and then the two sides formed by the members of the landing gear, is longer than the opposite side, so that the angle between it and the side to which the strut is attached is the most acute angle of the quadrilateral when the landing gear is in the landing position and becomes nearly a right angle when the landing gear is retracted whereas at the same instant, the angle between its other end and the side adjacent the quadrilateral is inverted.

5. A retractable landing gear as in claim 3, in which the pivoted end of said strut being arranged coaxially with the pivotal axis of said two members of the landing gear.

6. In aircraft, a jointed retractable structure, a strut in operative connection with said structure and movable therewith, said strut comprising coacting portions movable both with and with respect to each other, resilient means between said coacting portions adapted to be energized by relative movement of said portions in one direction, damping means included in said strut and active to brake the relative movement of said portions in the opposite direction, and a connection engaging said strut and at least a member of said structure, said connection being operative to move relatively said coacting portions in said first named direction responsive to at least the most part of the movement of said structure to a retracted position to thereby store energy and to impart the said energy to the structure for supplementing the action of gravity during the operation of extension the speed of which is limited by said damping means.

7. In aircraft, a retractable landing gear movable between an extended and a retracted position, means for retracting said landing gear, means for supplementing the action of gravity for the extension operation of said landing gear, a collapsible strut included in said last named means and movable with said latter between an extended and a retracted position, said strut including a pair of telescopic coacting portions movable both with and with respect to each other, resilient means between said coacting portions so arranged as to store energy during relative movement of said coacting portions in one direction and to expend it during relative movement of said portions in the other direction, damping means between said two coacting portions, said damping means being active to brake the relative movement of said portions in said other direction, and means responsive to at least the most part of the retraction operation of said retracting means for effecting relative movement of said coacting portions in said first named direction to thereby effect tensioning of said resilient means, said damping means braking the speed of the extension motion of said landing gear which takes place under the actions of gravity and of the said stored energy.

8. A landing gear as claimed in claim 7 in which said means for effecting movement of said portions includes a connection engaging said strut and which is operative to allow a small relative movement of said coacting portions in said other direction at the end of the retraction movement of the landing gear whereby the stored energy helps the retraction towards the end of said latter.

9. A combination as claimed in claim 6 in which said strut is an oleo-pneumatic shock absorber strut.

10. In an aircraft, a retractable landing gear movable between an extended and a retracted position, means for retracting said landing gear, means for supplementing the action of gravity for the extension operation of said landing gear, an oleo-pneumatic strut included in said landing gear and organized for movement with said landing gear between an extended and a retracted position, damping means in said strut adapted to brake the alteration of its length in one direction, said strut being arranged to store pneumatic energy upon alteration of its length in the other direction, and means responsive to at least a part of the retraction operation of said retracting means for altering the length of said strut in the said other direction, whereby the energy thus stored is expended during extension of the landing gear under the action of said energy and the action of gravity, said damping means braking the speed of the extension motion of the landing gear.

11. A retractable landing gear as claimed in claim 10 in which said means for altering the length of said strut includes a connection engaging said strut and at least another member of the gear.

12. A retractable landing gear as claimed in claim 10 in which said means for altering the length of said strut includes a hinged connection engaging said strut and at least another member of the gear, the whole being so designed that the swinging motion of said hinged connection during at least the beginning part of the retraction movement of the gear will be operative to produce an alteration of the length of said strut in the direction corresponding to storage of energy.

13. In aircraft, a jointed retractable structure, a strut in operative connection with said structure, said strut comprising coacting portions movable both with and with respect to each other, resilient means between said coacting portions adapted to be energized by relative movement of said portions in one direction, damping means included in said strut and active to brake the relative movement of said strut in the opposite direction and connecting means between said strut and at least one member of the structure, said connection being operative to move relatively said coacting portions in said first named direction responsive to the most part of the retraction and in a small extent in said opposite direction at the end of the retraction whereby helping the end of the retraction, the energy thus stored being active to help the operation of extension the speed of which is braked by said damping means.

14. A retractable landing gear as claimed in claim 2 including a leg and a folding strut, and in which said connecting means include a support rigid with said leg, an arm pivoted on said leg, and a bar pivoted both on said arm and on said folding strut, said strut being pivoted on said support and on said arm respectively.

15. A retractable landing gear as claimed in claim 10, including at least one tubular member forming part of said gear and forming a fluid-tight air container, and communication means between said strut and said tubular member.

CHARLES RAYMOND WASEIGE.